Sept. 6, 1949.  D. VAN WINKLE  2,480,891
ATTACHMENT FOR DIAL INDICATORS
Filed April 18, 1946
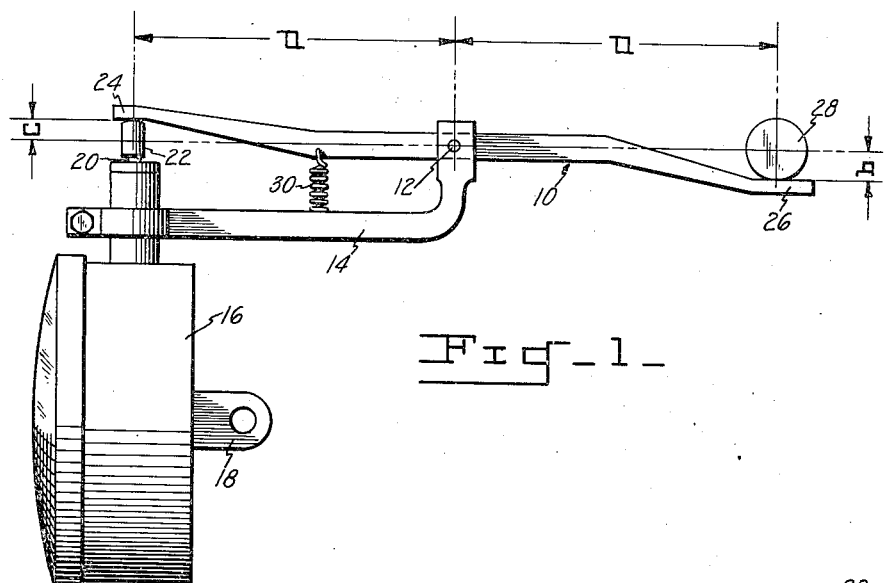
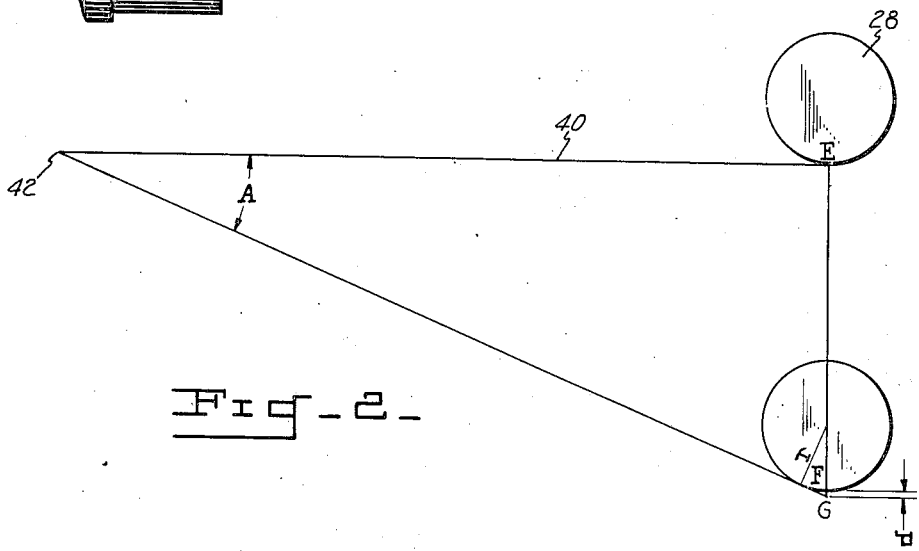
Inventor
Delbert Van Winkle
By J. H. Church & W. E. Thibodeau
Attorneys Patented Sept. 6, 1949

2,480,891

UNITED STATES PATENT OFFICE 2,480,891

ATTACHMENT FOR DIAL INDICATORS

Delbert Van Winkle, Pittsburgh, Pa.

Application April 18, 1946, Serial No. 662,996

2 Claims. (Cl. 33—172)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a simple lever system for accurately reproducing at a given point displacements or deflections produced at another point. For example, in an apparatus for testing the strain characteristics of materials by measuring the deflections of a specimen under stresses, it may be desirable or convenient to transmit such deflections to a measuring instrument through the medium of a simple lever such as a horizontal bar having a fulcrum preferably at its mid point and engaged near its ends by the specimen and the measuring instrument respectively. Assuming the bar to be rigid, vertical movements of the specimen will be proportionally reproduced at the other end of the bar, the ratio being determined by the vertical distances of the objects from the fulcrum point. If the objects have point contacts with the lever bar, this ratio is invariant. If, however, either object presents a spherical or cylindrical surface for contact with the lever, errors may result as hereinafter explained. It is an object of the present invention to obviate such errors.

For a more complete understanding of the invention, reference may be had to the following description thereof and to the drawing of which:

Fig. 1 is a diagrammatic view of a lever system embodying the invention; and

Fig. 2 is a geometric diagram to illustrate the discussion of the error to be corrected.

The lever system hereinafter described as an embodiment of the invention is adapted for use in connection with testing apparatus for investigating strain characteristics of material samples, equivalent apparatus within the purview of the invention can be employed for other purposes.

As shown in Fig. 1, a lever 10 is pivoted at 12 to a bracket 14 which is tightly secured to a dial gauge 16. The gauge 16 is supported by any suitable means such as a bracket 18 which can be secured to a support (not shown).

The dial gauge shown in the drawing may be of a standard variety having a stem 20. The axial movements of this stem are magnified by the mechanism inside the gauge so that the scale marks on the dial can indicate small fractions of an inch, for example, ten-thousandths. On the end of the stem 20 is a contact-piece 22 having a spherical end face which engages the end portion 24 of the lever 10. The other end portion 26 of the lever 10 engages a test specimen 28 which may be a cylindrical rod mounted in testing apparatus (not shown) for the application of bending stresses at its mid point where the rod engages the lever 10. A spring tension member 30 is connected between the lever 10 and the bracket 14 to hold the lever in contact with the specimen 28 and the contact-piece 22 so that any slight vertical movement of the portion of the specimen in contact with the lever will result in corresponding vertical movement of the stem 20. Generally speaking, such parallel movements will be in a ratio equal to that of the distances of the respective points of contact from the fulcrum point. If, as in the present instance, the elements 22 and 28 which engage the lever present thereto spherical or cylindrical surfaces having different radii of curvature, the rolling of such surfaces on the lever when the latter is rocked is liable to introduce an error in the gauge indication in the following manner.

In the diagram shown in Fig. 2, let the line 40 indicate half of a straight horizontal lever arm pivoted at a fulcrum point 42. The specimen 28 bears on the end portion of the lever arm. Suppose that the specimen moves vertically downward so as to rock the arm through an angle A, in so doing, the specimen rolls on the lever and moves the lever through a greater angle than a point-contact would do. For example, in the diagram, E F represents the vertical distance through which the object 28 moves to rock the arm through the angle A. A point contact would move through the distance E G to rock the arm through the same angle. The difference is F G or $d$.

It is evident that if $r$ is the radius of curvature of the object 28, then, $$\frac{r}{r+d} = \cos A \text{ or } d = r(\sec A - 1)$$

Thus $d$ is a function of $r$ as well as of the angle A. In other words, the distance of vertical movement of the object 28 corresponding to a given angle A will depend in part on the radius of curvature of the object. If therefore the two objects engaging the opposite end portions of the lever have different radii of curvature, their vertical movements are not in a constant ratio. In the apparatus shown in Fig. 1, if a straight lever were employed, this would introduce an error in the gauge reading which would vary with the angle of deflection since the curvatures of the surfaces of the elements 22 and 28 which bear against the lever are not equal.

According to the present invention, such error is obviated by offsetting the end portions of the arm by amounts equal to the respective radii of curvature. More specifically stated, the object-engaging surfaces of the end portions 24 and 26 of the lever are in planes which are parallel to a plane through the fulcrum point 42 and are respectively offset therefrom by distances equal to the radii of curvature of the engaging surfaces of the objects 22 and 28. As a result of this, the centers of curvature of the two objects lie on a line through the fulcrum point. Hence a constant ratio of vertical movements of the objects is maintained. If, for example, the elements 22 and 28 touch the lever 10 at points each of which is $a$ units from the fulcrum when the lever is horizontal and if the end 26 of the lever is offset $b$ units, the radius of the object 28, and the end 24 is offset $c$ units, the radius of the end surface of the element 22, then vertical displacements of the object 28 will be accurately duplicated by movements of the element 22.

I claim:

1. A device for indicating the deflections of a rounded member under stress comprising, an indicator having a spring pressed plunger, said plunger being provided with a rounded end, a bracket secured to said indicator, an elongated lever member pivotally mounted at its mid point on said bracket, one end portion of said lever member being in contact with said plunger and the other end portion of said lever member adapted to contact the rounded member, both of said end portions being respectively offset from the horizontal axis of said lever member a distance equal to the radius of the surface in contact therewith, and a spring arranged to maintain the respective end portions of said lever member in contact with said plunger and the rounded member whereby deflection of such rounded member moves said lever member to actuate said indicator whereon the amount of deflection is registered.

2. A measuring device for indicating the deflection of an object provided with a rounded surface and movable in a straight line comprising, an indicator having a spring pressed plunger provided with a rounded end, said plunger being movable in a straight line parallel to the path of movement of the object, a bracket secured to said indicator, an elongated lever member pivotally mounted at its mid point on said bracket, one end portion of said lever member being in contact with said plunger and the other end portion of said lever member adapted to contact the rounded surface of the object, both of said end portions being respectively offset from the horizontal axis of said lever member a distance equal to the radius of the surface in contact therewith, and a spring arranged to maintain the respective end portions of said lever member in contact with the rounded surfaces of said plunger and object whereby deflection of the object pivots said lever member to actuate said plunger whereby the amount of deflection of the object is registered on said indicator.

DELBERT VAN WINKLE.

REFERENCES CITED

The following references are of record in the file of this patent:

UNITED STATES PATENTS

| Number | Name | Date |
| --- | --- | --- |
| 968,884 | Reisner et al. | Aug. 30, 1910 |
| 1,872,566 | White | Aug. 16, 1932 |
| 1,993,247 | Penati | Mar. 5, 1935 |